(12) United States Patent
Wang

(10) Patent No.: US 11,684,196 B2
(45) Date of Patent: Jun. 27, 2023

(54) PRESSURE COOKER

(71) Applicant: Instant Brands Inc., Ottawa (CA)

(72) Inventor: Jiwei Wang, Ottawa (CA)

(73) Assignee: Instant Brands Inc., Ottawa (CA)

( * ) Notice: Subject to any disclaimer, the term of this patent is extended or adjusted under 35 U.S.C. 154(b) by 726 days.

(21) Appl. No.: 16/841,940

(22) Filed: Apr. 7, 2020

(65) Prior Publication Data

US 2020/0323380 A1 Oct. 15, 2020

(30) Foreign Application Priority Data

Apr. 10, 2019 (CN) .......................... 201910284707.2
Mar. 6, 2020 (CN) .......................... 202010151607.5

(51) Int. Cl.
*A47J 27/09* (2006.01)
*A47J 27/08* (2006.01)

(52) U.S. Cl.
CPC ........... *A47J 27/09* (2013.01); *A47J 27/0813* (2013.01)

(58) Field of Classification Search
CPC .... A47J 27/09; A47J 27/0813; A47J 27/0804; A47J 27/0815
See application file for complete search history.

(56) References Cited

FOREIGN PATENT DOCUMENTS

| CN | 2449610 | Y | 9/2001 | | |
|---|---|---|---|---|---|
| CN | 201131624 | Y | 10/2008 | | |
| CN | 201234872 | Y | 5/2009 | | |
| CN | 201536989 | U | 8/2010 | | |
| CN | 202112878 | U | 1/2012 | | |
| CN | 105919416 | A | * 9/2016 | .......... | A47J 27/0804 |
| CN | 106419526 | A | * 2/2017 | .......... | A47J 27/0815 |
| CN | 106805755 | A | 6/2017 | | |
| CN | 201085509 | Y | 8/2017 | | |
| CN | 107647771 | A | 2/2018 | | |
| CN | 108245002 | A | 7/2018 | | |
| CN | 108294616 | A | 7/2018 | | |
| CN | 109588973 | A | * 4/2019 | .......... | A47J 27/0815 |

OTHER PUBLICATIONS

Translation of CN-105919416-A (Year: 2016).*
Translation of CN-106419526-A (Year: 2017).*
Translation of CN-109588973-A (Year: 2019).*

* cited by examiner

*Primary Examiner* — Nathaniel E Wiehe
*Assistant Examiner* — Elizabeth M Kerr
(74) *Attorney, Agent, or Firm* — Crowell & Moring LLP

(57) ABSTRACT

A pressure cooker comprises a main body, a lid assembly, and an open-prevention assembly disposed on the lid assembly. The main body comprises a cooker rim and a cooker tooth extending therefrom, the open-prevention assembly comprises an open-prevention sliding block and a float device disposed on the lid assembly. With no pressure in the cooking chamber, rotating the lid will cause sliding movements of the open-prevention sliding block. With pressure in the cooking chamber, the float device will rise to prevent the open-prevention sliding block from sliding, thereby preventing the rotation of the lid. The open-prevention assembly comprises a locking sliding block coupled to the open-prevention sliding block. When a forced opening of the lid causes a deformation of the open-prevention sliding block, the locking sliding block lockingly engages the cooker tooth to prevent lid rotation, thereby ensuring safe use of the cooker.

19 Claims, 7 Drawing Sheets

PRESSURE COOKER

CROSS-REFERENCE TO RELATED APPLICATIONS

This application claims priority to Chinese Patent Applications 201910284707.2 filed on Apr. 10, 2019 and 202010151607.5 filed on Mar. 6, 2020, the entire contents of which are incorporated herein by reference.

TECHNICAL FIELD OF THE INVENTION

The present invention relates generally to the field of small kitchen appliances, and more particularly to a pressure cooker.

BACKGROUND OF THE INVENTION

Pressure cookers are commonly found household appliances. A conventional electric pressure cooker typically has an open-prevention sliding plate cooperating mechanism. When the pressure inside the cooker body reaches a certain level, a float valve is pushed upwardly into a position so as to inhibit the operation of the open-prevention sliding plate, thereby preventing the opening operation of the cooker lid and ensuring safe use of the electric pressure cooker. However, upon forced opening of the cooker lid, either by error or accident, the sliding plate can be easily deformed or damaged, and the protective coating on the cooker rim can be stripped off or destroyed, causing failures in lid opening operations.

SUMMARY OF THE INVENTION

The present invention provides a pressure cooker that facilitates safe lid opening operations.

In accordance with one aspect of the present disclosure, there is provided a pressure cooker comprising: a main body having a cooking chamber; a lid assembly for covering an opening of the main body and sealingly closing the cooking chamber; and an open-prevention assembly disposed on the lid assembly; wherein the main body comprises a substantially annular cooker rim disposed near a top portion of the main body, and at least one cooker tooth extending from the cooker rim; wherein the lid assembly comprises a lid rim operable to substantially enclose an exterior portion of the cooker rim, and at least one lid tooth extending from the lid rim; wherein the open-prevention assembly comprises an open-prevention sliding block and an open-prevention float device disposed on the lid assembly; wherein in the absence of pressure in the cooking chamber, a rotational operation of the lid assembly will cause a sliding movement of the open-prevention sliding block; wherein a presence of sufficient pressure in the cooking chamber will cause the open-prevention float device to rise to a position so as to prevent the sliding movement of the open-prevention sliding block, thereby preventing the rotational operation of the lid assembly; wherein the open-prevention assembly further comprises a locking sliding block coupled to the open-prevention sliding block, the locking sliding block being constructed and arrange such that upon a forced opening of the lid assembly causing a deformation of or damage to the open-prevention sliding block, the locking sliding block is operable to lockingly engage or cooperate with the at least one cooker tooth or a portion thereof so as to prevent the rotational operation of the lid assembly.

In accordance with some embodiments of the present disclosure, the open-prevention assembly comprises a push rod connected to the open-prevention sliding block; the at least one cooker tooth comprises a tooth body comprising an exterior sidewall having at least one tapered portion; wherein during the rotational operation of the lid assembly, the open-prevention sliding block slides with the push rod in response to a sliding engagement between the push rod and the exterior sidewall of the tooth body.

In accordance with some embodiments of the present disclosure, the at least one cooker tooth comprises a stopper block downwardly extending from the tooth body; the open-prevention assembly comprises a latch rod connected to the locking sliding block and disposed at a lower position relative to the push rod, wherein upon a forced opening of the lid assembly causing a deformation of or damage to the open-prevention sliding block, the locking sliding block is operable, by way of engagement between the latch rod and the stopper block, to prevent further opening operation of the lid assembly.

In accordance with some embodiments of the present disclosure, the open-prevention assembly further comprises an elastic member operable to bias the open-prevention sliding assembly so as to maintain a tendency of moving toward a center of the lid assembly; wherein during the rotational operation of the lid assembly, the open-prevention sliding block slides toward an exterior side of the lid assembly in response to the sliding engagement between the push rod and the exterior sidewall of the tooth body, and slides toward the center of the lid assembly in response to the biasing by the elastic member after the push rod slides beyond the exterior sidewall of the tooth body.

In accordance with some embodiments of the present disclosure, the locking sliding block is disposed behind the open-prevention sliding block along a direction of lid opening operation and spaced apart from the open-prevention sliding block at a predetermined distance; wherein when the lid assembly is rotated to an opening position, the latch rod is positioned at a predetermined clearance distance relative to the cooker tooth so as to allow unobstructed opening and closing of the lid assembly relative to the main body.

In accordance with some embodiments of the present disclosure, the at least one cooker tooth comprises a receptacle portion, the open-prevention assembly comprises a latch rod connected to the locking sliding block and operable to engage at least a portion of the exterior sidewall of the cooker tooth; wherein upon a forced opening of the lid assembly causing a deformation of or damage to the open-prevention sliding block, the locking sliding block is operable to prevent further opening operation of the lid assembly by way of engagement between the cooker tooth and the latch rod received in the receptacle portion.

In accordance with some embodiments of the present disclosure, a distance between the push rod and the latch rod, and a width of the receptacle portion are properly arranged or configured so that during a normal opening or closing operation of the lid assembly, when the push rod slides to reach the receptacle portion, the latch rod is positioned to engage the at least one cooker tooth or a portion thereof.

In accordance with some embodiments of the present disclosure, the at least one cooker tooth comprises at least one side portion substantially enclosing the receptacle portion for reinforcing the strength of the cooker tooth.

In accordance with some embodiments of the present disclosure, the push rod comprises a push rod top portion and a first assembled portion disposed at two opposing sides of the open-prevention sliding block, respectively; wherein the push rod top portion is operable to press against or engage the at least one cooker tooth or a portion thereof; and wherein the elastic member comprises a first elastic member disposed to substantially enclose the first assembled portion.

In accordance with some embodiments of the present disclosure, the latch rod comprises a latch rod top portion and a second assembled portion disposed at two opposing sides of the locking sliding block, respectively; wherein the elastic member comprises a second elastic member disposed to substantially enclose the second assembled portion.

In accordance with some embodiments of the present disclosure, the lid assembly comprises a handle; wherein the first elastic member is disposed between the handle and the open-prevention sliding block; and wherein the second elastic member is disposed between the handle and the locking sliding block.

In accordance with some embodiments of the present disclosure, the open-prevention assembly comprises a connecting portion connecting the locking sliding block and the open-prevention sliding block, and a guide aperture disposed on the connecting portion proximal to the locking sliding block; wherein the connecting portion comprises a narrowed portion disposed substantially at a center of the connecting portion; wherein the open-prevention float device is operable to rise to engage the guide aperture so as to prevent the open-prevention sliding block from sliding movement; and wherein upon a forced opening of the lid assembly causing a rupture of the narrowed portion, the locking sliding block is prevented from moving out of the receptacle portion.

In accordance with some embodiments of the present disclosure, the open-prevention assembly comprises an elastic connecting portion connecting the locking sliding block and the open-prevention sliding block; wherein the open-prevention float device is operable to rise to engage the guide aperture so as to prevent the open-prevention sliding block from sliding movement; and wherein a forced opening of the lid assembly will cause an elastic deformation of the connecting portion so as to prevent the connecting portion from rupture.

An open-prevention assembly of a pressure cooker in accordance with example embodiments of the present disclosure comprises an open-prevention sliding block and a locking sliding block coupled to the open-prevention sliding block; wherein upon a deformation and/or malfunction of the open-prevention sliding block, the locking sliding block remains operable to lockingly press against, abut or otherwise engage at least one cooker tooth or a portion thereof so as to prevent an opening operation of the lid assembly, thereby effectively ensuring the safe use of the pressure cooker.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
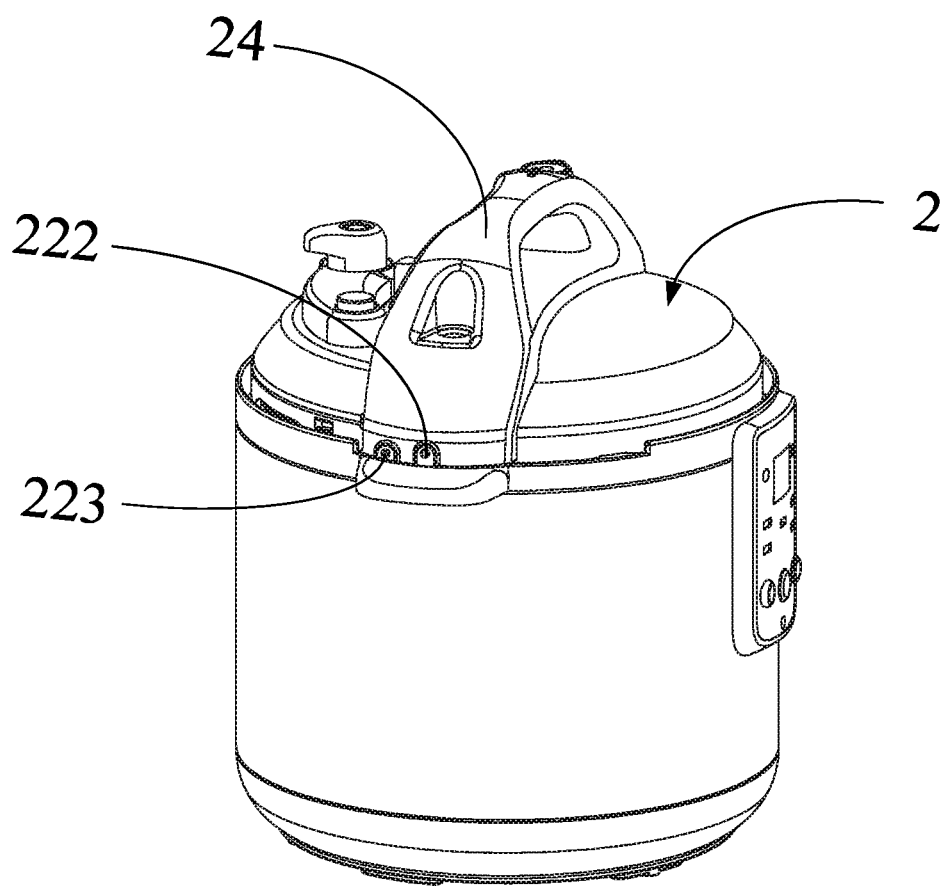
FIG. 1 is a perspective view illustrating a pressure cooker in accordance with an example embodiment of the present disclosure.
Figure 2:
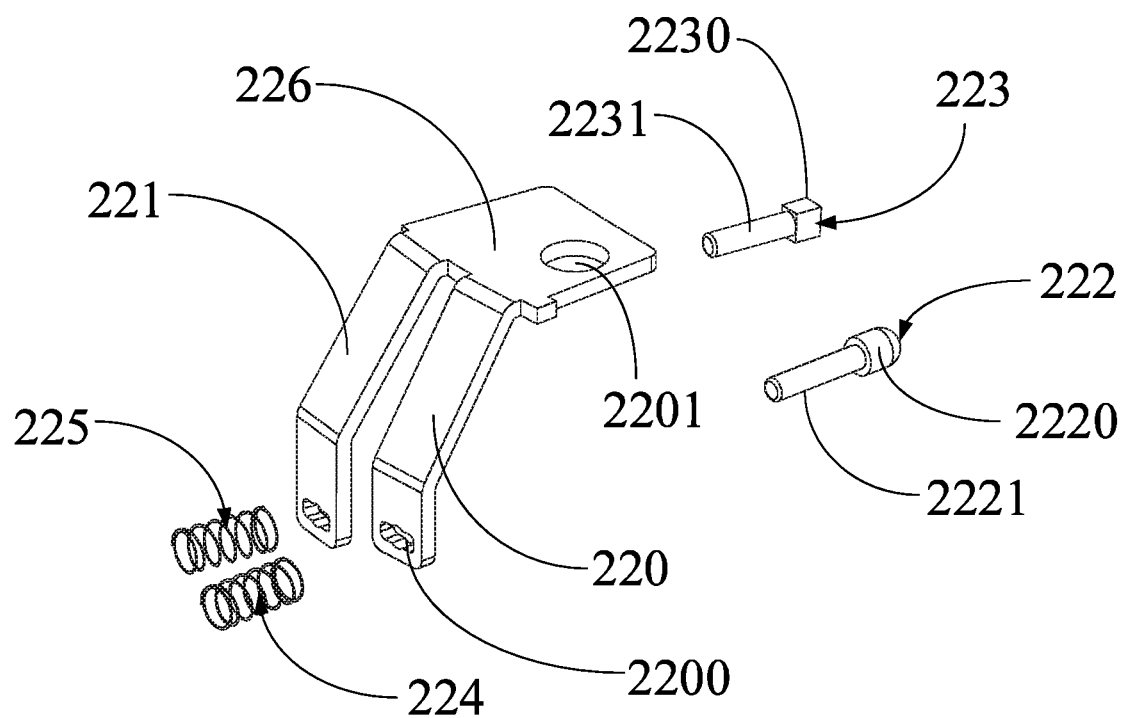
FIG. 2 is an exploded view of an example embodiment of an open-prevention sliding assembly of the pressure cooker of FIG. 1.
Figure 3:
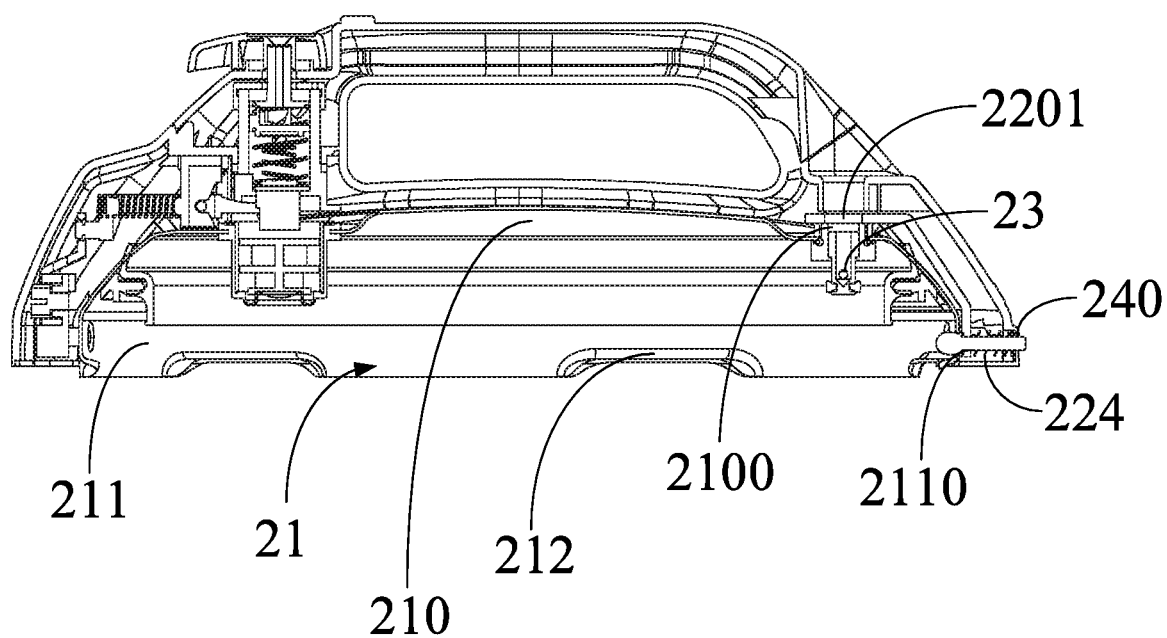
FIG. 3 is a schematic cross-sectional view of a lid assembly of the pressure cooker of FIG. 1, illustrating an embodiment of the open-prevention sliding assembly.
Figure 4:
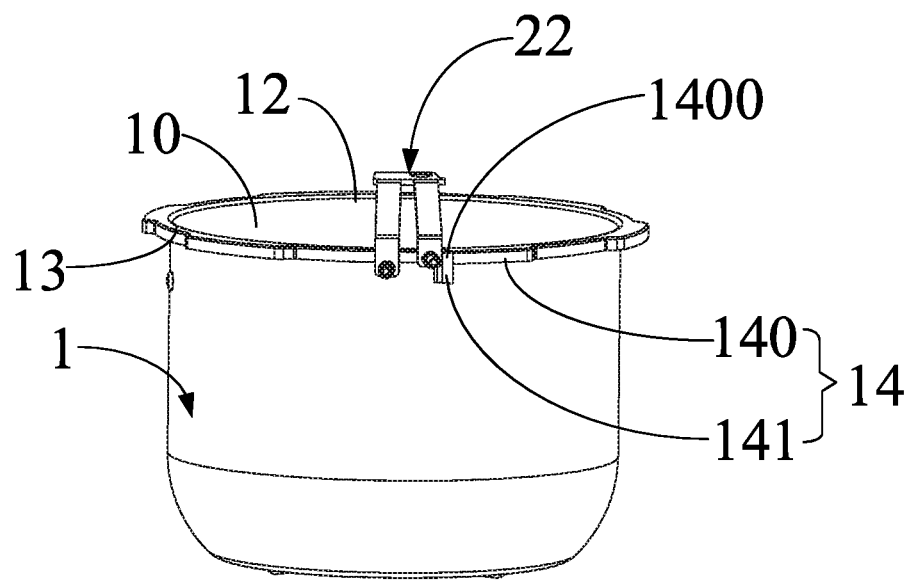
FIG. 4 is a schematic diagram showing an example abutting and/or pressing engagement between a push rod of the open-prevention sliding assembly and a cooker tooth.

Exemplary embodiments will be described in detail herein, examples of which are illustrated in the accompanying drawings. When the following description refers to the accompanying drawings, unless otherwise indicated, the same numbers in different drawings represent the same or similar elements. The embodiments described in the following exemplary embodiments do not represent all embodiments consistent with the present invention. Instead, they are merely examples of devices consistent with some aspects of the present disclosure as detailed in the appended claims.

The terms used in the present application are for the purpose of describing particular embodiments only, and are not intended to limit the present application. Unless otherwise defined, technical terms or scientific terms used herein should have the ordinary meanings as understood by those having ordinary skilled in the art to which the invention pertains. The words "first", "second" and similar terms used in the specification and claims of the present application do not denote any order, quantity, or importance, but are merely used to distinguish different components. Similarly, the words "a" or "an" and the like do not denote a quantity limitation, but mean that there is at least one. "Multiple" or "several" means two or more. Unless otherwise indicated, the terms "front", "rear", "lower" and/or "upper" and the like are used for convenience of description and are not limited to one location or one spatial orientation. "Including" or "comprising" and similar words mean that the elements or objects that appear before "including" or "comprising" encompass the elements or objects listed after "including" or "comprising" and their equivalents, and do not exclude other elements or objects. The words "connection" or "connected" and the like are not limited to physical or mechanical connections, but may include electrical connections, whether direct or indirect. As used herein and in the appended claims, the singular forms "a", "said", and "the" are intended to include the plural forms unless the context clearly dictates otherwise. It should also be understood that, as used herein, the term "and/or" refers to and includes any or all possible combinations of one or more of the associated listed items.

Referring to FIGS. 1-4, a pressure cooker according to an example embodiment of the present disclosure comprises a main body 1 having a cooking chamber 10 disposed therein; and a lid assembly 2 for covering an opening 12 of the main body 1 and sealingly closing the cooking chamber 10. The main body 1 comprises a substantially annular cooker rim 13 disposed near a top portion of the main body 1, and at least one cooker tooth 14 outwardly projecting and extending from the cooker rim 13. In some embodiments, the cooker tooth 14 comprises a tooth body 140 and a stopper block 141 downwardly extending from the tooth body 140. The tooth body 140 comprises an exterior sidewall 1400 having at least one tapered end portion. In some embodiments, the lid assembly 2 is constructed and arranged in accordance with relevant international standards for rotational operations, i.e., clockwise rotation for closure operation, and counter-clockwise rotation for open operation.

In some embodiments, the lid assembly 2 comprises a lower lid 21, an open-prevention assembly 22, an open-prevention float device 23 coupled to the lower lid 21, and a handle 24. The lower lid 21 comprises a top portion 210, a lid rim 211 extending from the top portion 210, and a plurality of lid teeth 212 inwardly projecting and extending from a bottom portion of the lid rim 211. The lid rim 211 is operable to substantially surround or enclose the cooker rim 13. The top portion 210 comprises a through-aperture 2100 disposed thereon for allowing the open-prevention float device 23 or a portion thereof to extend through. The lid rim 211 comprises a first fitting through-aperture 2110 disposed thereon. The handle 24 comprises a second fitting through-aperture 240 that corresponds with the first fitting through-aperture 2110.

In some embodiments, the open-prevention assembly 22 comprises an open-prevention sliding block 220, a locking sliding block 221, a connecting portion 226 connected to the open-prevention sliding block 220 and the locking sliding block 221, a push rod 222 connected to the open-prevention sliding block 220, and a latch rod 223 connected to the locking sliding block 221. In some embodiments, the latch rod 223 is disposed at a position that is lower than the position of the push rod 222. During a rotational opening operation of the lid assembly, if there is no pressure within the cooking chamber 10, the push rod 222 is operable to slidingly engage the exterior sidewall 1400 to cause a sliding movement of the open-prevention sliding block 220; if there is sufficient pressure within the cooking chamber 10, the open-prevention float device 23 will rise to a position so as to prevent the sliding movement of the open-prevention sliding block 220, thereby preventing the rotational opening operation of the lid assembly 2. In some embodiments, the locking sliding block 221 is disposed behind the open-prevention sliding block 220 along a direction of lid opening operation, and is spaced apart from the open-prevention sliding block 220 at a predetermined distance, wherein when the lid assembly 2 is rotated to a lid opening position, the latch rod 223 is positioned at a predetermined clearance distance from an end of the cooker tooth 14 so as to allow unobstructed opening and closing of the lid assembly 2 relative to the main body.

In some embodiments, the open-prevention assembly 22 further comprises an elastic member; wherein the elastic member is operable to bias the open-prevention assembly 22 so as to maintain a tendency of sliding movement toward a center of the lid assembly 2; wherein during the rotational opening operation of the lid assembly, the open-prevention sliding block 220 slides toward an exterior side of the lid assembly 2 in response to the sliding engagement between the push rod 222 and the exterior sidewall 1400 of the tooth body 140 of the cooker tooth 14, and slides toward a center of the lid assembly 2 in response to the biasing by the elastic member after the push rod 222 slides beyond a length of the exterior sidewall 1400 of the tooth body 140 of the cooker tooth 14; and wherein the locking sliding block 221 is disposed behind the open-prevention sliding block 220 along a direction of lid opening operation, and is spaced apart from the open-prevention sliding block 220 at a predetermined distance, wherein when the lid assembly 2 is rotated to a lid opening position, the latch rod 223 is positioned at a predetermined clearance distance from an end of the cooker tooth 14 so as to allow unobstructed opening and closing of the lid assembly 2 relative to the main body.

In some embodiments, the elastic member comprises a first elastic member 224 disposed to substantially enclose the push rod 222, and a second elastic member 225 disposed to substantially enclose the latch rod 223. The push rod 222 is disposed to extend through the first fitting through-aperture 2110 of the lid rim 211 and the second fitting through-aperture 240 of the handle 24. The first elastic member 224 is disposed between the handle 24 and the open-prevention sliding block 220. The second elastic member 225 is disposed between the handle 24 and the locking sliding block 221. The open-prevention sliding block 220 is operable to move relative to the first elastic member 224 and exert a pressure thereon, whereas the first elastic member 224 is operable to apply an elastic force to the open-prevention sliding block 220 for restoring the open-prevention sliding block 220 to a balanced position thereof. The locking sliding block 221 is operable to move relative to the second elastic member 225 and exert a pressure thereon, whereas the second elastic member 225 is operable to apply an elastic force to the locking sliding block 221 for restoring the locking sliding block 221 to a balanced position thereof. Along a vertical direction, the latch rod 223 is disposed at a position that is lower than a position of the push rod 222. The latch rod 223 and the push rod 222 are disposed to be substantially equidistant from a center of the lid rim 211.

In some embodiments, as shown in the Figures, the open-prevention sliding block 220 is disposed to be in front of the locking sliding block 221, and leads the locking sliding block 221 during a lid opening rotation, and as such the open-prevention sliding block 220 will engage or press against the cooker tooth 14 before the locking sliding block 221. The cooker tooth 14 in such embodiments is constructed and arranged to be slightly shorter than a regular or conventional cooker tooth known in the art, so that interference between the latch rod 223 and the cooker tooth 14 or a part thereof is avoided when the cooker tooth 14 is in a staggered position relative to the lid tooth 212, i.e., when the lid assembly is in an open position.

In some embodiments, as shown in the Figures, the push rod 222 is assembled to the open-prevention sliding block 220, wherein the open-prevention sliding block 220 comprises a through-orifice 2200 for coupling the push rod 222 therethrough. In some embodiments, the push rod 222 can be integrally constructed with the open-prevention sliding block 220 to form a single piece. The connection configurations between the latch rod 223 and the locking sliding block 221 are similar to those between the push rod 222 and the open-prevention sliding block 220 described herein, and will not be further discussed in detail.

In some embodiments, the push rod 222 comprises a push rod top portion 2220 and a first assembled portion 2221 disposed at two opposing sides of the open-prevention sliding block 220, respectively, wherein the first elastic member 224 is disposed to substantially enclose the first assembled portion 2221. The push rod top portion 2220 has a smooth contacting surface facing the cooker tooth 14 so as to allow the push rod top portion 2220 to slide along the cooker tooth 14. The latch rod 223 comprises a latch rod top portion 2230 and a second assembled portion 2231 disposed at two opposing sides of the locking sliding block 221, respectively, wherein the second elastic member 225 is disposed to substantially enclose the second assembled portion 2231. The latch rod top portion 2230 can be of any shape suitable for its purpose.

In some embodiments, the open-prevention sliding block 220 comprises a guide aperture 2201 corresponding to the through-aperture 2100. When a sufficiently high pressure is generated within the cooking chamber, the open-prevention float device 23 will be elevated or raised to pass through the guide aperture 2201 of the open-prevention sliding block 220, so as to inhibit the open-prevention sliding block 220 from movements, and prevent the push rod top portion 2220 of the push rod 222 from sliding movements along the cooker tooth 14, thereby preventing the rotational movements of the lid assembly 2 when the push rod 222 is pressed against the cooker tooth 14. As the cooker tooth 14 and the lid tooth 212 are vertically aligned and pressed against each other in this situation, the lid assembly 2 will be locked down and cannot be opened, thereby effectively ensuring the safe use of the pressure cooker.

Figure 5:
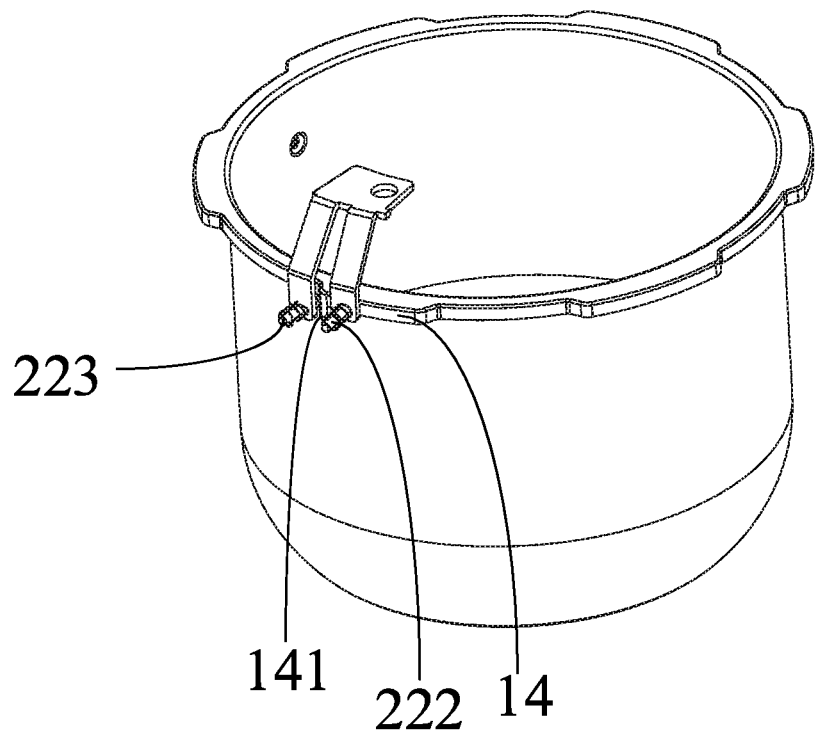
FIG. 5 is a schematic diagram showing an example abutting and/or pressing engagement between a latch rod of the open-prevention sliding assembly and a cooker tooth.
Figure 6:
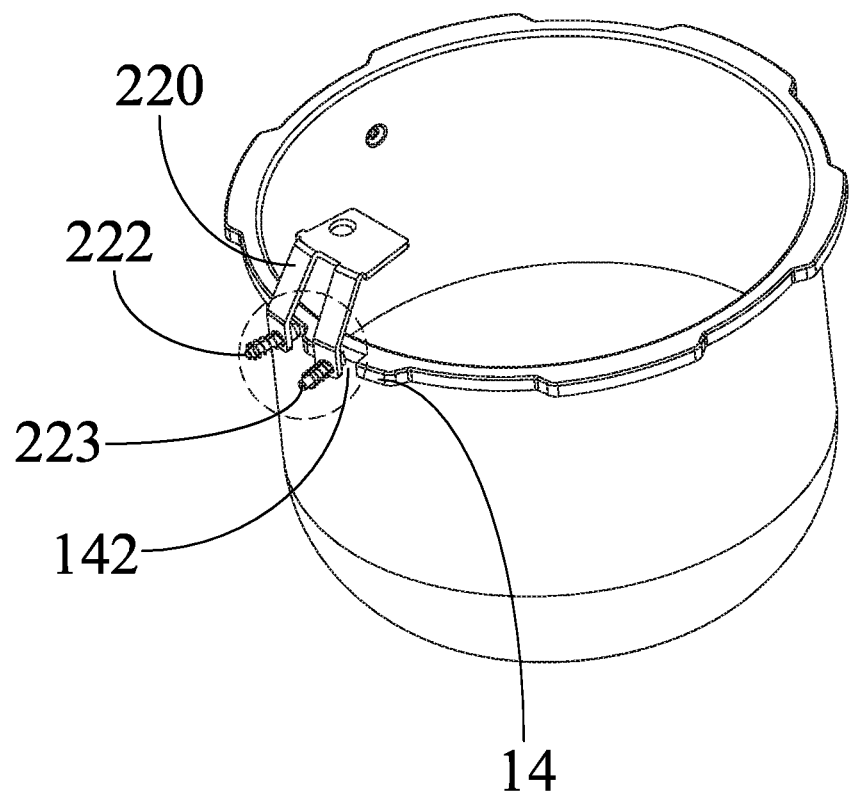
FIG. 6 is a schematic diagram showing an example engagement between an open-prevention sliding assembly and a cooker tooth in accordance with another example embodiment of a pressure cooker of the present disclosure.
Figure 7:
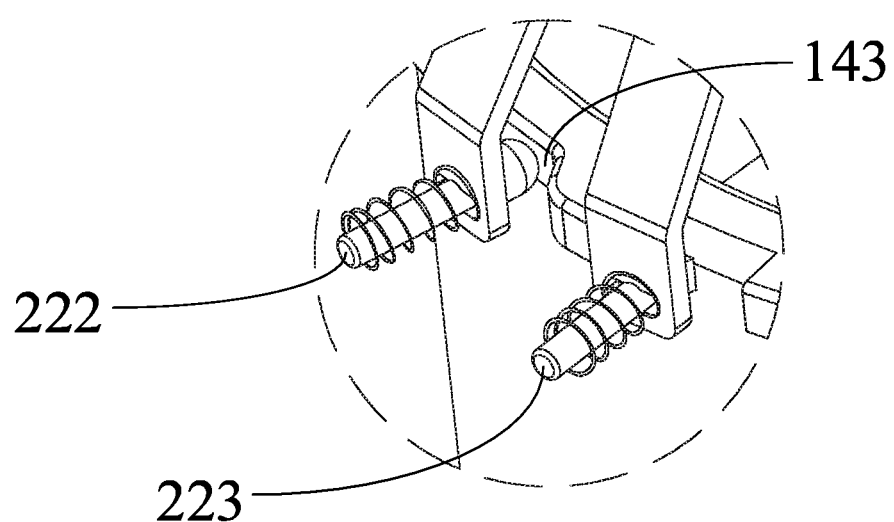
FIG. 7 is a magnified view of the circled area of FIG. 6.
Figure 8:
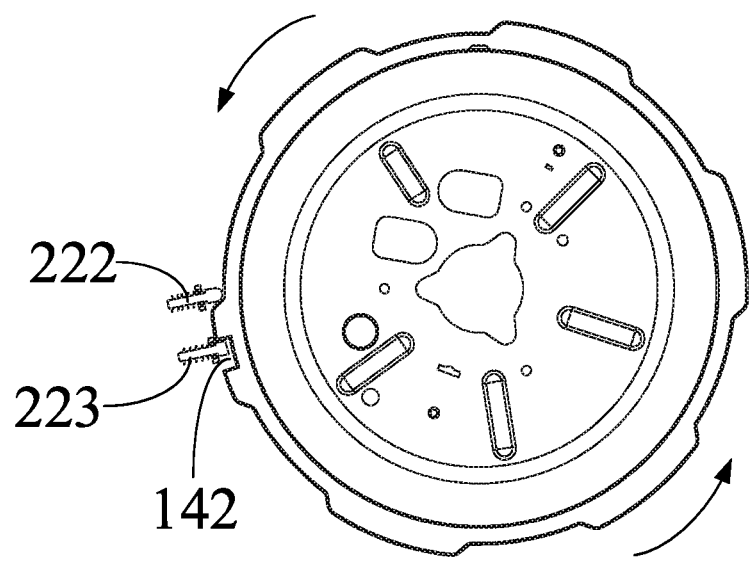
FIG. 8 is a schematic cross-sectional view of FIG. 6 taken along a circumferential direction of the cooker rim illustrated therein, showing a top view of the cross section.
Figure 9:
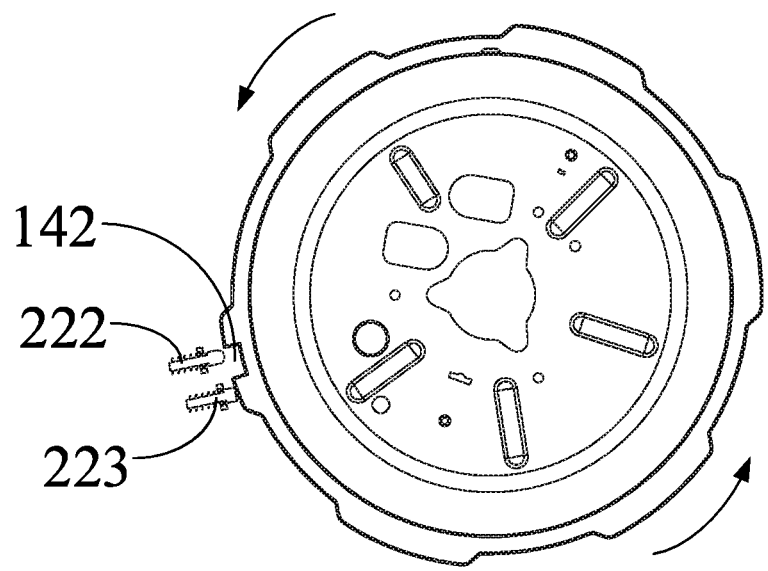
FIG. 9 is a view similar to FIG. 8, showing an example embodiment of a latch rod sliding out of a receptacle portion of a cooker tooth.

Referring to FIG. 5, in some embodiments, when the lid assembly 2 is subject to a forced opening operation causing a deformation of or damage to the open-prevention sliding block 220, the latch rod 223 connected to the locking sliding block 221 is operable to lockingly engage or press against the stopper block 141 to prevent rotational movements of the lid assembly 2, thereby preventing the lid assembly 2 from being opened.

To open the lid assembly 2, the pressure in the cooking chamber needs to be released. When there is substantially no pressure within the cooking chamber 10, the open-prevention float device 23 will undertake a downward movement under the force of gravity so as to disengage from the open-prevention sliding block 220. As the open-prevention sliding block 220 is free from constraints of the open-prevention float device 23, if the lid assembly 2 is now rotated, the push rod 222 can slide along the cooker tooth 14 causing the open-prevention sliding block 220 and the locking sliding block 221 to move outwardly relative to a center of the lid assembly 2, so that the locking sliding block 221 is disengaged or unlocked from the stopper block 141 of the cooker tooth 14, thereby allowing the rotational movements of the lid assembly 2 for lid opening operation.

When there is sufficiently high pressure within the cooking chamber 10, the open-prevention float device 23 will be raised or elevated to pass through the guide aperture 2201 of the open-prevention sliding block 220 to inhibit the open-prevention sliding block 220 from movements so that the push rod 222 is pressed or held against the cooker tooth 14, thereby preventing the rotational movements of the lid assembly 2 so that the lid assembly 2 cannot be opened, and ensuring the safe use of the pressure cooker.

Referring to FIGS. 6-9, in accordance with some other example embodiments, the cooker tooth 14 comprises a receptacle portion 142 and at least one side portion 143 substantially enclosing the receptacle portion 142. A width of the receptacle portion 142 and a distance between the push rod 222 and the latch rod 223 are properly arranged and/or selected, so that during a normal opening or closing operation of the lid assembly 2 (the arrows in the Figures indicate a lid opening direction), as the push rod 222 commences sliding engagement or cooperation with the exterior sidewall 1400 of the cooker tooth 14, the latch rod 223 commences a movement out of the receptacle portion 142; and when the push rod 222 slides to reach the receptacle portion 142, the latch rod 223 is positioned and operable to slidingly engage the exterior sidewall 1400 of the cooker tooth 14 so as to guide the open-prevention assembly 22 to smoothly slide across the cooker tooth 14 without interference.

In some embodiments, as shown in the Figures, the receptacle portion 142 is constructed and arranged as a recess. However, the present disclosure is not limited as such, and in some embodiments, the receptacle portion 142 is formed as an aperture, for example, or other similar structures suitable for its purpose.

Figure 10:
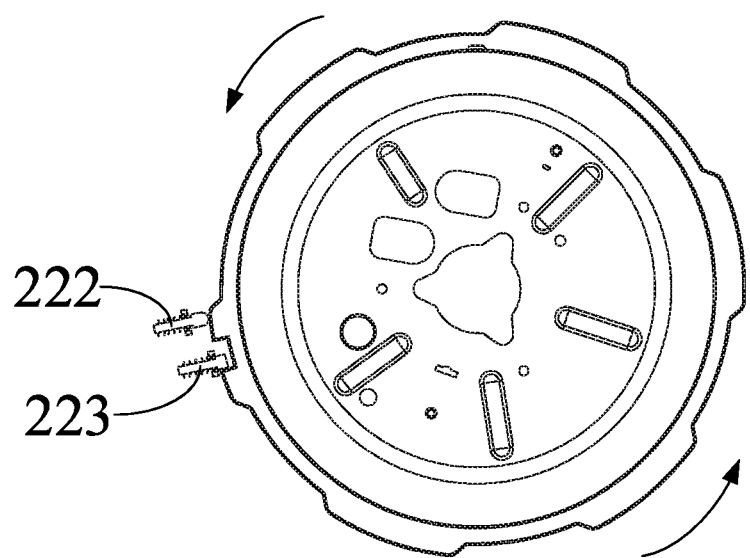
FIG. 10 is a view similar to FIG. 8, showing an example embodiment wherein the open-prevention sliding block undergoes deformation, while the latch rod lockingly engages the cooker tooth or a portion thereof.

The side portion 143 advantageously enhances and/or reinforces the strength of the cooker tooth 14. When the open-prevention float device 23 is elevated, the latch rod 223 will be received within the receptacle portion 142, and is pressed against or otherwise lockingly engaged with the cooker tooth 14 or a portion thereof. Referring now to FIG. 10, the open-prevention sliding block 220 in this situation has been deformed or damaged as a result of attempts at forced opening of the lid assembly, causing a failure or inability of the push rod 222 in pressing or holding against the cooker tooth 14 or a portion thereof. However, by virtue of the latch rod 223 being in position to press or hold against the cooker tooth 14 or a portion thereof, the lid assembly 2 still cannot be rotated and as such cannot be opened. In use, upon releasing the pressure within the pressure cooker, to open the lid assembly, a user can rotate the lid assembly 2, causing the push rod 222 to slide along the cooker tooth 14, and causing the open-prevention sliding block 220 and the locking sliding block 221 to move outwardly relative to a center of the lid assembly 2, so that the locking sliding block 221 moves out of the receptacle portion 142, thereby allowing the rotational movements of the lid assembly 2 for lid opening operation.

Figure 11:
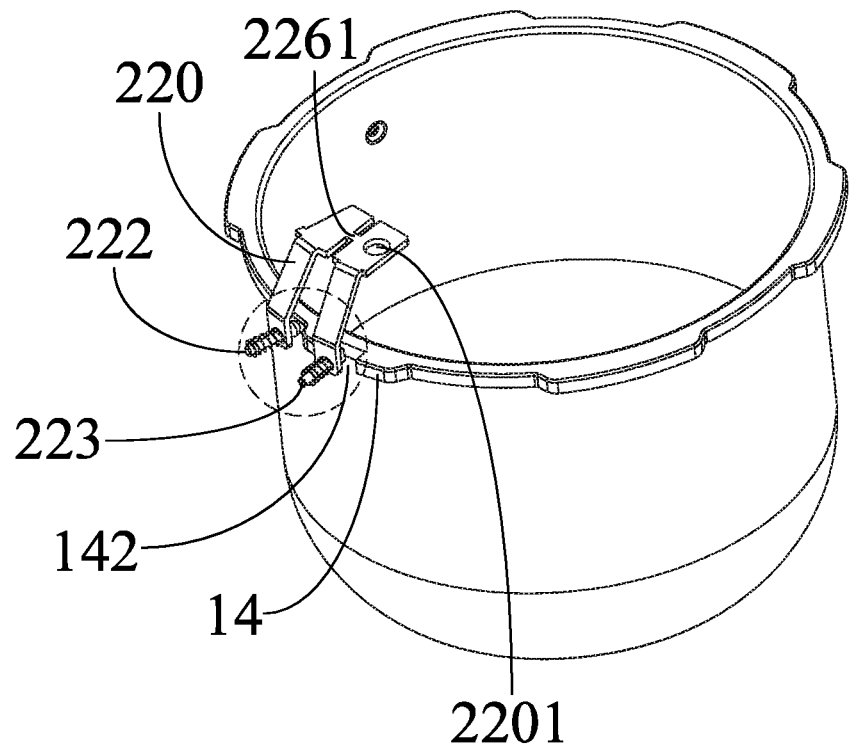
FIG. 11 is a schematic diagram showing an example engagement between an open-prevention sliding assembly and a cooker tooth in accordance with another example embodiment of a pressure cooker of the present disclosure.

Referring to FIG. 11, in some example embodiments, the connecting portion 226 comprises a narrowed portion 2261 disposed substantially at a center of the connecting portion 226; wherein the guide aperture 2201 is disposed in proximity to the locking sliding block 221; wherein upon a forced opening of the lid assembly 2 causing a rupture of the narrowed portion 2261, the locking sliding block 221 is broken off or detached from the open-prevention sliding block 220, and as a result the locking sliding block 221 can no longer be guided by or slidingly engage the cooker tooth 14, so that the locking sliding block 221 is prevented from moving out of the receptacle portion 142, thereby effectively ensuring the safety of lid opening operation.

Figure 12:
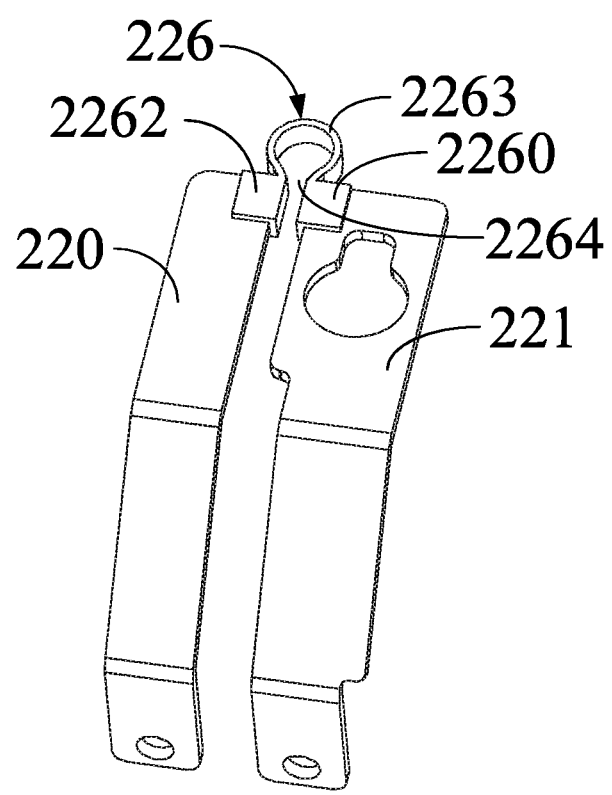
FIG. 12 is a schematic diagram showing an embodiment of the open-prevention sliding assembly in accordance with another example embodiment of a pressure cooker of the present disclosure.

Referring to FIG. 12, in some example embodiments, the connecting portion 226 is elastic. Advantageously, upon a forced opening of the lid assembly 2, an elastic connecting portion 226 can avoid being ruptured or broken off so as to render the lid assembly 2 completely unopenable. In some embodiments, the connecting portion 226 is connected to a respective end portion of the open-prevention sliding block 220 and the locking sliding block 221. The connecting portion 226 can be fastened or secured to the open-prevention sliding block 220 and the locking sliding block 221 by way of welding, rivets, or other similar means. In some embodiments, the connecting portion 226 comprises a first connecting portion 2260 coupled to the locking sliding block 221, a second connecting portion 2262 coupled to the open-prevention sliding block 220, and a third connecting portion 2263 connecting the first connecting portion 2260 and the second connecting portion 2262. The first connecting portion 2260 is disposed to cover or enclose a portion of an upper surface (not numbered) of the locking sliding block 221 and a portion of a side surface thereof (not numbered) that is substantially perpendicular to the upper surface. The second connecting portion 2262 is disposed to cover or enclose a portion of an upper surface (not numbered) of the open-prevention sliding block 220 and a portion of a side surface thereof (not numbered) that is substantially perpendicular to the upper surface. The third connecting portion 2263 is substantially circular or annular in shape, and extends from the first connecting portion 2260 and the second connecting portion 2262, respectively, and extending away from the open-prevention sliding block 220 and the locking sliding block 221. The third connecting portion 2263 defines an opening 2264, the opening 2264 being disposed to open toward or face a gap between the open-prevention sliding block 220 and the locking sliding block 221. Preferably, the third connecting portion 2263 is constructed and arranged to have good or excellent elasticity so as to effectively prevent the connecting portion 226 from rupture caused by external force.

An open-prevention assembly 22 of a pressure cooker in accordance with example embodiments of the present disclosure comprises an open-prevention sliding block 220 and a locking sliding block 221 coupled to the open-prevention sliding block 220; wherein upon a deformation and/or malfunction of the open-prevention sliding block 220, the locking sliding block 221 remains operable to lockingly press against, abut or otherwise engage at least one cooker tooth 14 or a portion thereof so as to prevent an opening operation of the lid assembly 2, thereby effectively ensuring the safe use of the pressure cooker.

The foregoing description is of preferred embodiments of the present application only, and is not intended to limit the present application in any way. Without departing from the technical scope of the present application, a person of ordinary skills in the art may make certain modifications or equivalent substitutions to the disclosed technical contents. Any simple modifications, equivalent changes or equivalent substitutions made to the above embodiments in accordance with the technical principle of the present application are still within the scope of the technical solutions of the present application.

What is claimed is:

1. A pressure cooker comprising:
a main body comprising a cooking chamber;
a lid assembly for covering an opening of the main body and closing the cooking chamber;
an open-prevention assembly disposed on the lid assembly;
wherein the main body comprises a substantially annular cooker rim disposed near a top portion of the main body, and at least one cooker tooth extending from the cooker rim;
wherein the lid assembly comprises a lid rim and at least one lid tooth extending from the lid rim;
wherein the open-prevention assembly comprises an open-prevention sliding block and an open-prevention float disposed on the lid assembly;
wherein in the absence of pressure in the cooking chamber, a rotational operation of the lid assembly will cause a sliding movement of the open-prevention sliding block;
wherein a presence of sufficient pressure in the cooking chamber will cause the open-prevention float to rise to a position so as to prevent the sliding movement of the open-prevention sliding block, thereby preventing the rotational operation of the lid assembly;
wherein the open-prevention assembly further comprises a locking sliding block coupled to the open-prevention sliding block, the locking sliding block being constructed and arranged such that upon a forced opening of the lid assembly causing a deformation of or damage to the open-prevention sliding block, the locking sliding block is operable to engage with the at least one cooker tooth or a portion thereof so as to prevent the rotational operation of the lid assembly;
wherein the open-prevention assembly comprises a push rod connected to the open-prevention sliding block, and the at least one cooker tooth comprises a tooth body comprising an exterior sidewall having at least one tapered portion, wherein during the rotational operation of the lid assembly, the open-prevention sliding block slides with the push rod in response to a sliding engagement between the push rod and the exterior sidewall of the tooth body; and,
wherein the at least one cooker tooth comprises a stopper block downwardly extending from the tooth body, the open-prevention assembly comprises a latch rod connected to the locking sliding block and disposed at a lower position relative to the push rod, and upon the forced opening of the lid assembly causing the deformation of or damage to the open-prevention sliding block, the locking sliding block is operable, by way of engagement between the latch rod and the stopper block, to prevent further opening operation of the lid assembly.

2. The pressure cooker of claim 1, wherein:
the open-prevention assembly further comprises an elastic member operable to bias the open-prevention assembly so as to maintain a tendency of moving toward a center of the lid assembly; and
during the rotational operation of the lid assembly, the open-prevention sliding block slides toward an exterior side of the lid assembly in response to the sliding engagement between the push rod and the exterior sidewall of the tooth body, and slides toward the center of the lid assembly in response to the biasing by the elastic member after the push rod slides beyond the exterior sidewall of the tooth body.

3. The pressure cooker of claim 2, wherein:
the locking sliding block is disposed behind the open-prevention sliding block along a direction of lid opening operation and spaced apart from the open-prevention sliding block at a predetermined distance; and
when the lid assembly is rotated to an opening position, the latch rod is positioned at a predetermined clearance distance from an end of the cooker tooth so as to allow unobstructed opening and closing of the lid assembly relative to the main body.

4. The pressure cooker of claim 2, wherein:
the push rod comprises a push rod top portion and a first assembled portion disposed at two opposing sides of the open-prevention sliding block, respectively; and
the push rod top portion is operable to press against or engage the at least one cooker tooth or a portion thereof; and wherein the elastic member comprises a first elastic member disposed to substantially enclose the first assembled portion.

5. The pressure cooker of claim 4, wherein:
the latch rod comprises a latch rod top portion and a second assembled portion disposed at two opposing sides of the locking sliding block, respectively; and
the elastic member comprises a second elastic member disposed to substantially enclose the second assembled portion.

6. The pressure cooker of claim 1, wherein:
the lid assembly comprises a handle;
a first elastic member is disposed between the handle and the open-prevention sliding block; and
a second elastic member is disposed between the handle and the locking sliding block.

7. The pressure cooker of claim 1, wherein:
the open-prevention assembly comprises a connecting portion connecting the locking sliding block and the open-prevention sliding block, and a guide aperture disposed on the connecting portion proximal to the locking sliding block;
the connecting portion comprises a narrowed portion disposed substantially at a center of the connecting portion; and
the open-prevention float is operable to rise to engage the guide aperture so as to prevent the open-prevention sliding block from sliding movement.

8. The pressure cooker of claim 1, wherein:
the open-prevention assembly comprises an elastic connecting portion connecting the locking sliding block and the open-prevention sliding block;
the open-prevention float is operable to rise to engage the guide aperture so as to prevent the open-prevention sliding block from sliding movement; and the forced opening of the lid assembly will cause an elastic deformation of the connecting portion so as to prevent the connecting portion from rupture.

9. A pressure cooker comprising:
a main body having a cooking chamber, the main body comprising a substantially annular cooker rim disposed near a top portion of the main body, and at least one cooker tooth extending from the cooker rim, wherein the at least one cooker tooth comprises a tooth body with an exterior sidewall having at least one tapered portion, and a stopper block downwardly extending from the tooth body;
a lid assembly for covering an opening of the main body and closing the cooking chamber, the lid assembly comprising a lid rim and at least one lid tooth extending from the lid rim;
an open-prevention float disposed on the lid assembly, the open-prevention float movable between a lower position in the absence of pressure in the cooking chamber and a raised position in response to a threshold pressure in the cooking chamber;
a push rod operatively connected to an open-prevention sliding block disposed on the lid assembly, wherein the push rod is moveable with the open-prevention sliding block in response to sliding engagement between the push rod and the exterior sidewall of the tooth body during rotational operation of the lid assembly when the open-prevention float is at the lower position, and wherein the push rod is not moveable with the open-prevention sliding block during rotational operation of the lid assembly when the open-prevention float is at the raised position, thereby preventing rotation of the lid assembly;
a latch rod operatively connected to a locking sliding block, the locking sliding block being coupled to the open-prevention sliding block, and the latch rod being disposed at a lower position relative to the push rod;
wherein when the open-prevention float is at the raised position, and a deformation or damage of the open-prevention sliding block occurs due to a forced opening of the lid assembly, an engagement between the latch rod and the stopper block in response to rotational operation of the lid assembly prevents further rotation of the lid assembly.

10. The pressure cooker of claim 9, wherein:
the locking sliding block is disposed behind the open-prevention sliding block along a direction of lid opening operation, and spaced apart from the open-prevention sliding block at a predetermined distance; and,
when the lid assembly is rotated to an opening position, the latch rod is positioned at a predetermined clearance distance from an end of the cooker tooth so as to allow unobstructed opening and closing of the lid assembly relative to the main body.

11. The pressure cooker of claim 9, wherein:
a first elastic member operable to bias the open-prevention sliding block so as to maintain a tendency of moving toward a center of the lid assembly;
a second elastic member operable to bias the locking sliding block so as to maintain a tendency of moving toward a center of the lid assembly;
wherein during the rotational operation of the lid assembly, the open-prevention sliding block slides toward an exterior side of the lid assembly in response to the sliding engagement between the push rod and the exterior sidewall of the tooth body, and slides toward the center of the lid assembly in response to the biasing by the first elastic member after the push rod slides beyond the exterior sidewall of the tooth body.

12. The pressure cooker of claim 9, further comprising an elastic connecting portion connecting the locking sliding block and the open-prevention sliding block, wherein the open-prevention float is operable to rise to engage the guide aperture so as to prevent the open-prevention sliding block from sliding movement, and the forced opening of the lid assembly will cause an elastic deformation of the connecting portion so as to prevent the connecting portion from rupture.

13. The pressure cooker of claim 9, further comprising a connecting portion connecting the locking sliding block and the open-prevention sliding block, and a guide aperture disposed on the connecting portion proximal to the locking sliding block, wherein the connecting portion comprises a narrowed portion disposed substantially at a center of the connecting portion, and the open-prevention float is operable to rise to engage the guide aperture so as to prevent the open-prevention sliding block from sliding movement.

14. A pressure cooker comprising:
a main body having a cooking chamber, the main body comprising a substantially annular cooker rim disposed near a top portion of the main body, and at least one cooker tooth extending from the cooker rim, wherein the at least one cooker tooth comprises a tooth body with an exterior sidewall having at least one tapered portion, and a receptacle portion;

a lid assembly for covering an opening of the main body and closing the cooking chamber, the lid assembly comprising a lid rim and at least one lid tooth extending from the lid rim;

an open-prevention float disposed on the lid assembly, the open-prevention float movable between a lower position in the absence of pressure in the cooking chamber and a raised position in response to a threshold pressure in the cooking chamber;

a push rod operatively connected to an open-prevention sliding block disposed on the lid assembly, wherein the push rod is moveable with the open-prevention sliding block in response to sliding engagement between the push rod and the exterior sidewall of the tooth body during rotational operation of the lid assembly when the open-prevention float is at the lower position, and wherein the push rod is not moveable with the open-prevention sliding block during rotational operation of the lid assembly when the open-prevention float is at the raised position, thereby preventing rotation of the lid assembly;

a latch rod operatively connected to a locking sliding block, the locking sliding block being coupled to the open-prevention sliding block;

wherein when the open-prevention float is at the raised position, and a deformation or damage of the open-prevention sliding block occurs due to a forced opening of the lid assembly, receipt of the latch rod within the receptacle portion of the at least one cooker tooth in response to rotational operation of the lid assembly prevents further rotation of the lid assembly.

15. The pressure cooker of claim 14, wherein:

a first elastic member operable to bias the open-prevention sliding block so as to maintain a tendency of moving toward a center of the lid assembly;

a second elastic member operable to bias the locking sliding block so as to maintain a tendency of moving toward a center of the lid assembly;

wherein during the rotational operation of the lid assembly, the open-prevention sliding block slides toward an exterior side of the lid assembly in response to the sliding engagement between the push rod and the exterior sidewall of the tooth body, and slides toward the center of the lid assembly in response to the biasing by the first elastic member after the push rod slides beyond the exterior sidewall of the tooth body.

16. The pressure cooker of claim 14, wherein a distance between the push rod and the latch rod, and a width of the receptacle portion are arranged so that during a normal opening or closing operation of the lid assembly, when the push rod slides to reach the receptacle portion, the latch rod is positioned to engage the at least one cooker tooth or a portion thereof.

17. The pressure cooker of claim 14, wherein the at least one cooker tooth comprises at least one side portion substantially enclosing the receptacle portion for reinforcing the strength of the at least one cooker tooth.

18. The pressure cooker of claim 14, further comprising a connecting portion connecting the locking sliding block and the open-prevention sliding block, and a guide aperture disposed on the connecting portion, wherein the connecting portion comprises a narrowed portion disposed substantially at a center of the connecting portion, wherein the open-prevention float is operable to rise to engage the guide aperture so as to prevent the open-prevention sliding block from sliding movement, and wherein upon the forced opening of the lid assembly causing a rupture of the narrowed portion, the locking sliding block is prevented from moving out of the receptacle portion.

19. The pressure cooker of claim 14, further comprising an elastic connecting portion connecting the locking sliding block and the open-prevention sliding block, wherein the open-prevention float is operable to rise to engage the guide aperture so as to prevent the open-prevention sliding block from sliding movement, and a forced opening of the lid assembly will cause an elastic deformation of the connecting portion so as to prevent the connecting portion from rupture.

* * * * *